E. E. CAMPBELL.
CAR ATTACHMENT.
APPLICATION FILED JUNE 2, 1911.
1,039,361.
Patented Sept. 24, 1912.
2 SHEETS—SHEET 1.
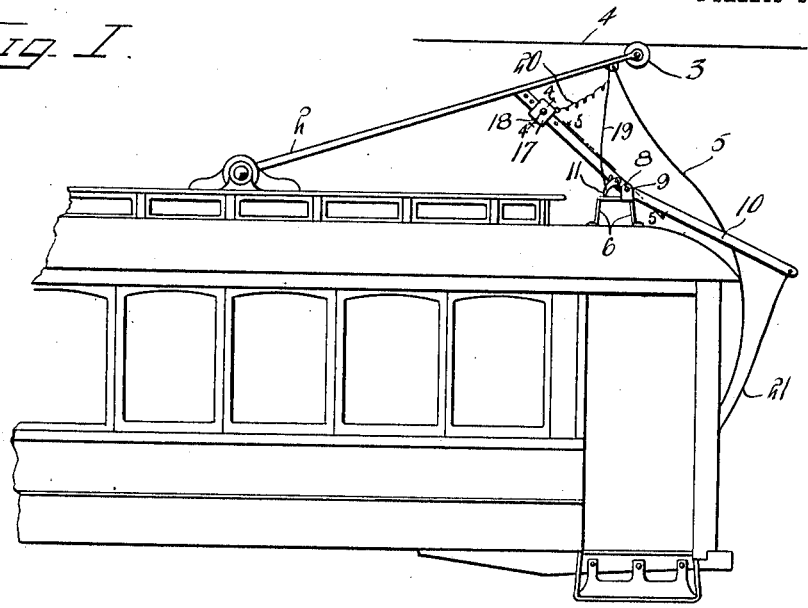
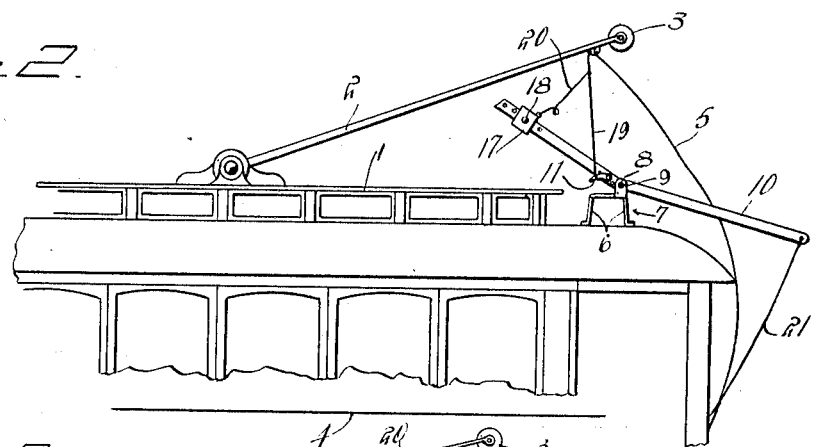
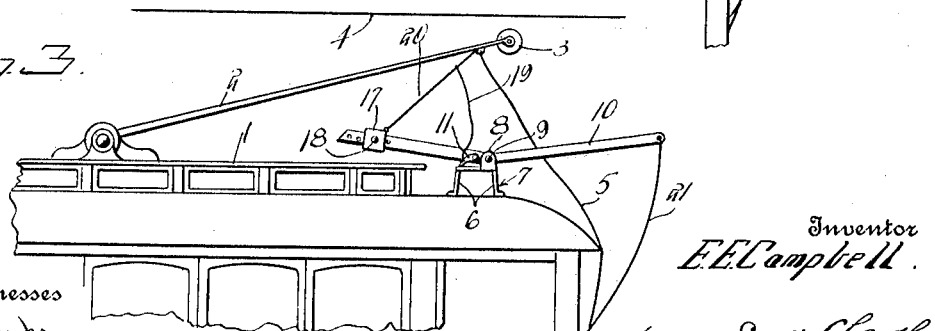

E. E. CAMPBELL.
CAR ATTACHMENT.
APPLICATION FILED JUNE 2, 1911.
1,039,361.
Patented Sept. 24, 1912.
2 SHEETS—SHEET 2.
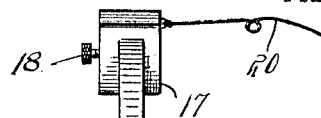
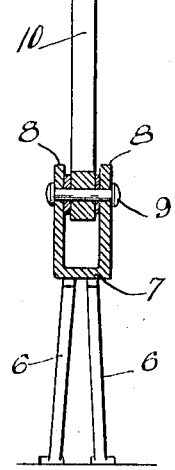
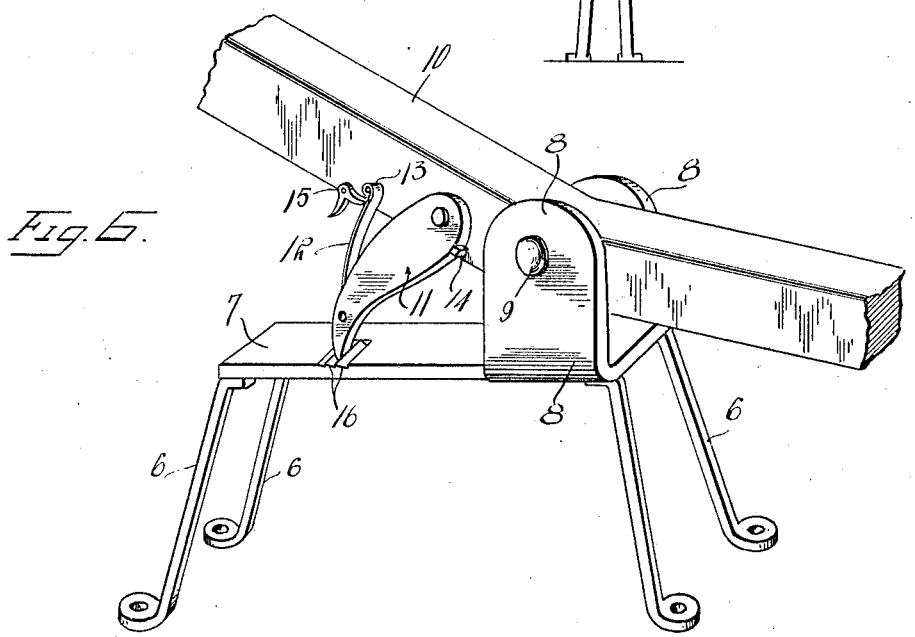
Witnesses
J. C. Simpson
H. K. Parsons
Inventor
E. E. Campbell
By Harry Ellis Chandler
Attorney
COLUMBIA PLANOGRAPH CO., WASHINGTON, D. C.

UNITED STATES PATENT OFFICE.

EMIL E. CAMPBELL, OF TACOMA, WASHINGTON.

CAR ATTACHMENT.

1,039,361.  Specification of Letters Patent.  Patented Sept. 24, 1912.

Application filed June 2, 1911. Serial No. 630,740.

*To all whom it may concern:*

Be it known that I, EMIL E. CAMPBELL, a citizen of the United States, residing at Tacoma, in the county of Pierce and State of Washington, have invented certain new and useful Improvements in Car Attachments, of which the following is a specification.

My invention relates to improvements in car attachments and the leading object of my invention is the provision of an improved device which may be readily secured to an ordinary trolley car and which will serve to automatically draw downward the trolley of the car when the same leaves the wire and will thus prevent either the jerking upward of the trolley rope into position where it will be necessary for the conductor or the motorman of the car to climb on the roof of the car to reset the trolley wheel on the wire, and will also prevent damaging of the trolley wire or the guy wires therefor by banging thereagainst of the trolley pole.

A further object of my invention is the provision of a weight device set in operation by the upward flying of the trolley pole out of engagement with the trolley wire which will serve to draw down the trolley against the car when so flying upward.

Other objects and advantages of my improved car attachment will be readily apparent from the following description taken in connection with the accompanying drawings and it will be understood that I may make any modifications in the specific structure shown and described within the scope of my claims without departing from or exceeding the spirit of my invention.

Figure 1 represents a side elevation of a car equipped with my attachment showing the various parts in normal position. Fig. 2 shows the position occupied by the various parts as the trolley wheel leaves the trolley wire. Fig. 3 shows the trolley drawn down by my attachment. Fig. 4 represents a sectional view on the line 4—4 of Fig. 1. Fig. 5 represents a sectional view on the line 5—5 of Fig. 1, and Fig. 6 represents a detailed perspective view of the supporting bracket of my device and a portion of the lever pivoted to said brackets.

In the drawings, the numeral 1 designates the roof of the car having secured thereto in the customary manner the trolley pole 2 having at its upper end the trolley wheel 3 riding on the trolley wire 4 while secured to the trolley pole 2 is the customary rope 5 for moving and controlling the pole.

Secured on the roof of the car are the depending legs 6 of the bracket plate 7 which has rising therefrom the ears 8 between which is pivoted on the pivot 9 the angular lever bar 10. Said bar has pivoted to it adjacent the ears 8 the dog 11, a blade spring 12 being secured to the lever 10 by the bolt 13, said blade spring having its lower end bearing against the dog to force the same downward, an abutment 14 limiting the downward movement of the pawl, while a second abutment 15 limits the upward movement of the pawl and spring.

The plate 7 is formed near one edge with the upstanding teeth or serrations 16 normally engaged by the dog or pawl 11, the engagement of the dog with said teeth limiting the pivotal movement of the lever 10. Said lever 10 has adjustably secured on its upper end the weight 17 held in desired position by the set screw 18, the dog 11 normally preventing the weight from causing the upper end of the lever to swing downward.

Secured to and depending from the trolley pole 2 is the wire or rope 19 having its other end secured to the dog or pawl 11, when the trolley flies upward the movement imparted to the connection 19 lifting the pawl out of engagement with the teeth 16 and allowing the weighted end of the lever to descend. A second branch rope or wire 20 is secured to the wire 19 near the upper end thereof, said connection 20 having its other end secured to the weight 17, whereby when the lever 10 is released by the upward flying of the trolley its weighted end will descend and draw down with it the trolley into the position shown in Fig. 3. To draw the lever back into its set position, I secure to its lower end the rope 21 which extends into the rear of the car and serves to swing the lever in a reverse direction until the pawl 11 engages the teeth 16 the trolley being shifted and set through the movement of the rope 5 in the usual manner.

From the foregoing description the construction and operation of my improved trolley controlling attachment for cars will be readily understood and it will be seen that I have provided a simple and efficient device which may be readily secured in position on an ordinary trolley car and which will prove entirely satisfactory.

I claim:

1. The combination with a car, of a trolley therefor, a bracket mounted on the roof of the car, a lever pivoted to the bracket and having a weighted upper end, a pawl pivoted to the lever and engaging the bracket for normally locking the weighted end of the lever in raised position, connections between the trolley and the pawl for moving the pawl out of engagement with the bracket when the trolley pole rises, and connections between the trolley pole and the weighted end of the lever, whereby when the trolley slips off the trolley wire its upward movement will release the pawl to permit the weighted end of the lever to descend and the descent of said weighted end will draw the trolley downward with it.

2. The combination with a car, of a bracket secured on the roof thereof, said bracket having upstanding ears, a lever pivoted between the ears, said lever having a weighted upper end, means for normally locking the weighted end in raised position, connections between said weighted end and the trolley of the car, and means operable when the trolley slips off the trolley wire for releasing the weighted end to allow the same to descend and draw the trolley downward.

In testimony whereof I affix my signature, in the presence of two witnesses.

EMIL E. CAMPBELL.

Witnesses:
CHAS. L. MOSES,
C. S. HARLEY.

Copies of this patent may be obtained for five cents each, by addressing the "Commissioner of Patents, Washington, D. C."